(12) United States Patent
Mistichelli

(10) Patent No.: US 10,933,792 B2
(45) Date of Patent: Mar. 2, 2021

(54) VEHICLE LOG HITCH

(71) Applicant: Riccardo Mistichelli, New Market, MD (US)

(72) Inventor: Riccardo Mistichelli, New Market, MD (US)

( * ) Notice: Subject to any disclaimer, the term of this patent is extended or adjusted under 35 U.S.C. 154(b) by 58 days.

(21) Appl. No.: 15/885,612

(22) Filed: Jan. 31, 2018

(65) Prior Publication Data

US 2019/0232850 A1 Aug. 1, 2019

(51) Int. Cl.
| | | |
|---|---|---|
| *B60P 1/54* | (2006.01) | |
| *A01G 23/00* | (2006.01) | |
| *B66C 23/44* | (2006.01) | |
| *B60P 3/41* | (2006.01) | |

(52) U.S. Cl.
CPC .......... *B60P 1/5471* (2013.01); *A01G 23/003* (2013.01); *A01G 23/006* (2013.01); *B60P 3/41* (2013.01); *B66C 23/44* (2013.01)

(58) Field of Classification Search
CPC ... A01G 23/003; A01G 23/006; B60P 1/5471; B60P 3/41; B66C 23/44
See application file for complete search history.

(56) References Cited

U.S. PATENT DOCUMENTS

| | | | | | |
|---|---|---|---|---|---|
| 2,433,822 A | * | 12/1947 | Bartholomew | ........... | B60P 3/41 414/460 |
| 2,518,322 A | * | 8/1950 | Hovey-King | ............. | B60P 3/41 254/326 |
| 3,515,297 A | * | 6/1970 | Symons | .................... | B60P 3/41 254/326 |
| 3,517,839 A | * | 6/1970 | Jorgensen | ................. | B60P 3/41 414/559 |
| 3,549,029 A | * | 12/1970 | Rutter | ....................... | B60P 1/48 414/555 |
| 6,138,991 A | | 10/2000 | Myers, Jr. | | |
| 6,155,771 A | | 12/2000 | Montz | | |
| 6,231,030 B1 | * | 5/2001 | Smith | .................. | A01G 23/006 254/324 |
| 6,932,555 B2 | * | 8/2005 | Dale | ......................... | B66F 9/06 187/226 |
| 7,472,916 B2 | * | 1/2009 | Varcoe | .................. | A01G 23/003 280/19 |
| 7,547,180 B2 | * | 6/2009 | Nye | ...................... | A01G 23/006 294/118 |
| 7,568,876 B1 | * | 8/2009 | Tenney | ................ | A01G 23/006 414/538 |
| 7,611,320 B2 | * | 11/2009 | Bell | .......................... | B60P 3/41 144/4.1 |
| 8,444,361 B1 | * | 5/2013 | Hershey | ............... | A01G 23/006 254/324 |

(Continued)

FOREIGN PATENT DOCUMENTS

CA        1121314 A  *  4/1982  ............. B66C 23/44

*Primary Examiner* — James Keenan
(74) *Attorney, Agent, or Firm* — Dunlap Bennett & Ludwig, PLLC; Brendan E. Squire

(57) ABSTRACT

A hitch attachment for dragging logs from a vehicle. The hitch attachment includes a base having a distal end and a proximal end. The proximal end of the base is configured to fit within a tow receiver of the vehicle. A vertical frame extends from the base in between the proximal end and the distal end. A log cradle is coupled to the distal end of the base. The log cradle includes a plurality of vertically extending teeth.

8 Claims, 3 Drawing Sheets

(56) References Cited

U.S. PATENT DOCUMENTS

| | | | |
|---|---|---|---|
| 8,616,540 B2 * | 12/2013 | Maire | B27B 17/0075 |
| | | | 269/296 |
| 9,131,647 B1 * | 9/2015 | Lindberg | A01G 23/003 |
| 9,668,429 B2 * | 6/2017 | Dixon | B60P 3/41 |
| 2002/0048504 A1 * | 4/2002 | Jacobs | B60P 1/5433 |
| | | | 414/541 |
| 2006/0120842 A1 | 6/2006 | Thompson | |
| 2006/0280584 A1 * | 12/2006 | Spuzak | B66C 23/44 |
| | | | 414/462 |
| 2008/0206035 A1 * | 8/2008 | Lucco | A01G 23/006 |
| | | | 414/787 |
| 2013/0309054 A1 * | 11/2013 | Lazos | B66F 9/00 |
| | | | 414/543 |

\* cited by examiner

VEHICLE LOG HITCH

BACKGROUND OF THE INVENTION

The present invention relates to a vehicle log hitch and, more particularly, to a hitch that attaches to vehicles in order to transport logs.

All-terrain vehicles (ATV) are very popular means of transportation by hunters and other outdoor enthusiasts. Cargo racks provided on an ATV can be used to transport objects. Heavy objects, such as logs, could require assistance to lift and load onto the cargo rack of an ATV. Further, the cargo track may not be suitable to transport larger objects. In the prior art, hoists have been proposed to aid in lifting cargo onto the cargo racks of ATVs. However, as mentioned above, cargo racks of ATVs are not suitable to transport larger objects, such as logs.

As can be seen, there is a need for a hitch that attaches to vehicles in order to transport logs.

SUMMARY OF THE INVENTION

In one aspect of the present invention, a log hitch comprises: a base comprising a distal end and a proximal end, wherein the proximal end is configured to fit within a tow receiver; a vertical frame member extending from the base in between the proximal end and the distal end; and a log cradle coupled to the distal end of the base, the log cradle comprising a plurality of vertically extending teeth.

In another aspect of the present invention, a log hitch comprises: a base comprising a distal end and a proximal end, wherein the proximal end is configured to fit within a tow receiver; a vertical frame member extending from the base in between the proximal end and the distal end; a log cradle coupled to the distal end of the base, the log cradle comprising a plurality of vertically extending teeth; a winch coupled to the vertical frame member; a horizontal frame member extending from a top end of the vertical frame member; and a pulley coupled to the horizontal frame member, wherein a cable from the winch runs through the pulley.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
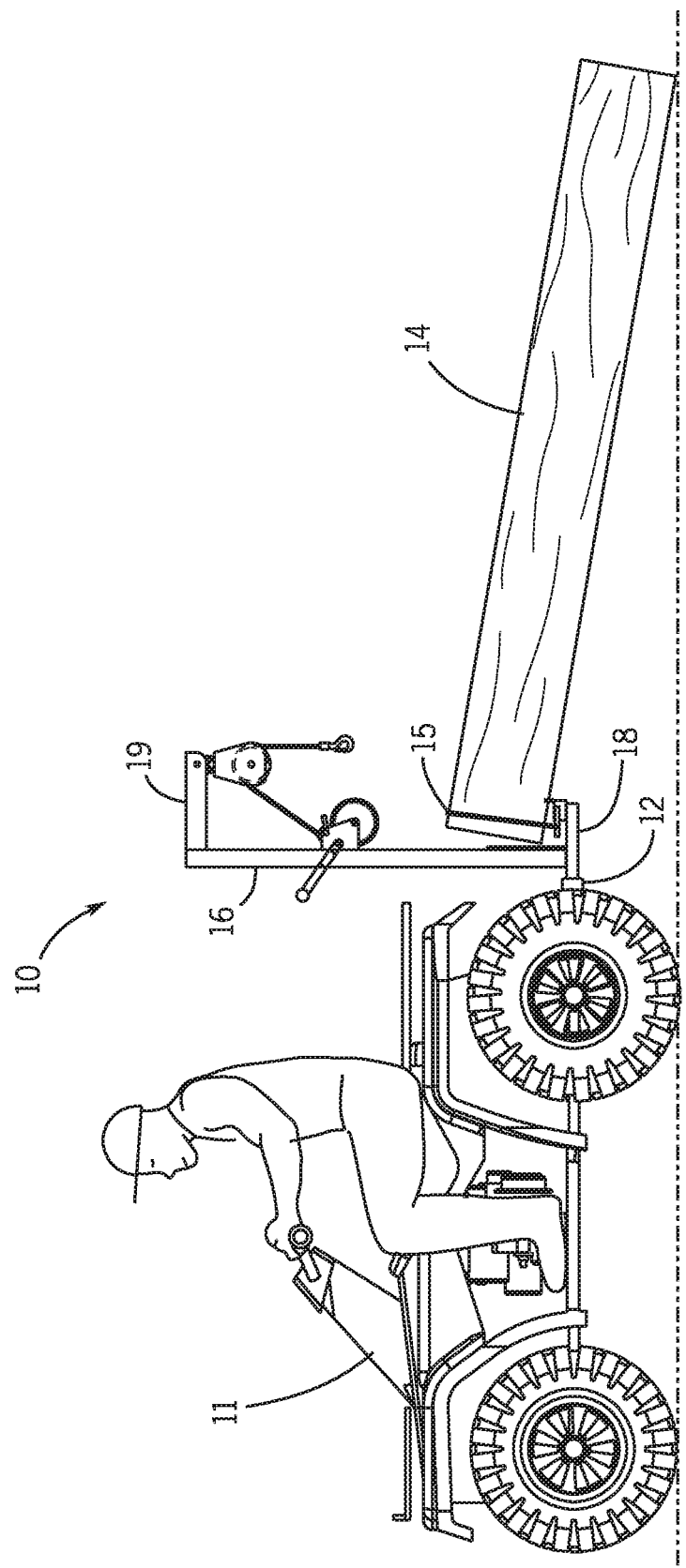
FIG. 1 is a side view of an embodiment of the present invention in use.
Figure 2:
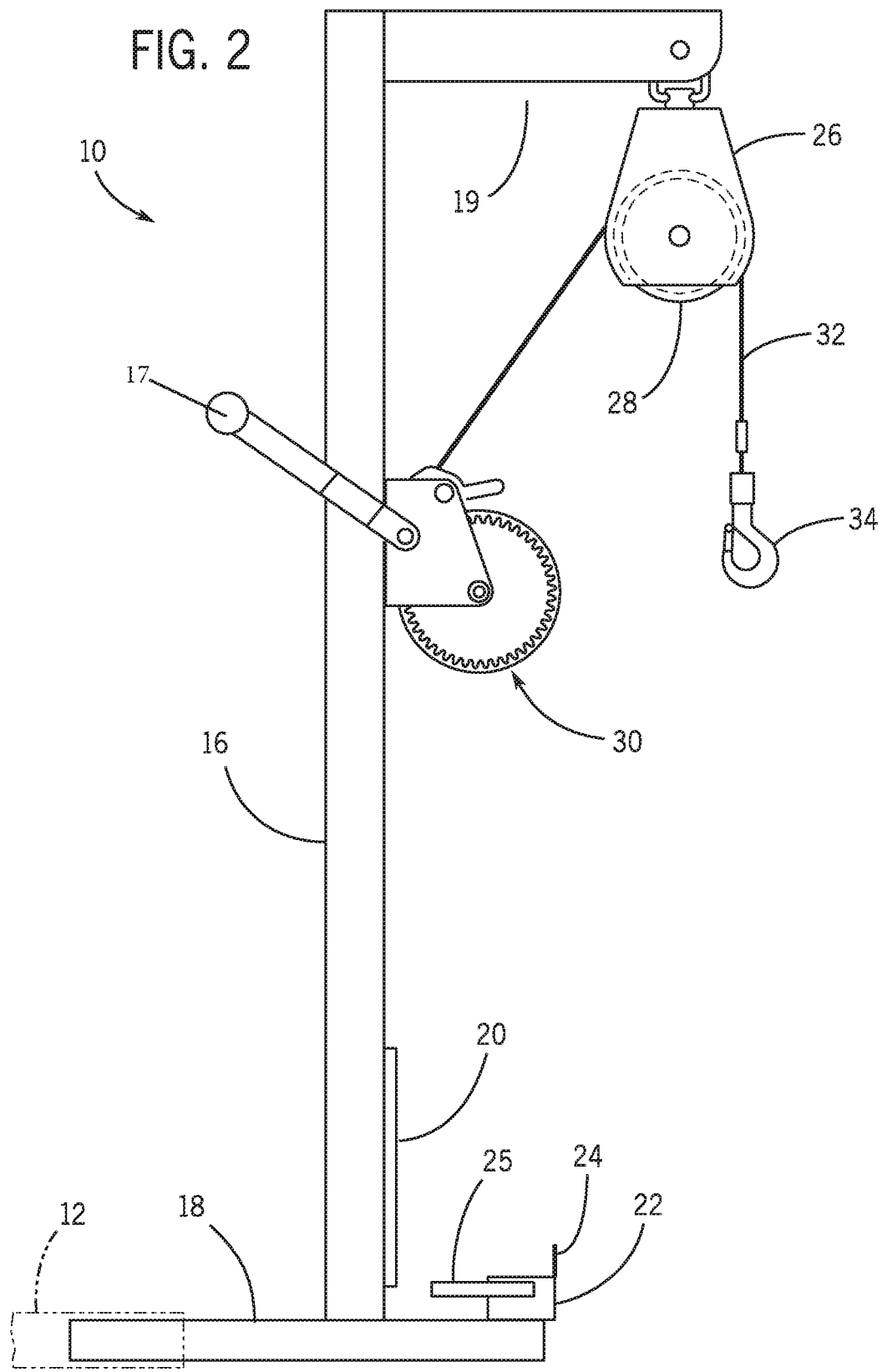
FIG. 2 is a side view of an embodiment of the present invention.
Figure 3:
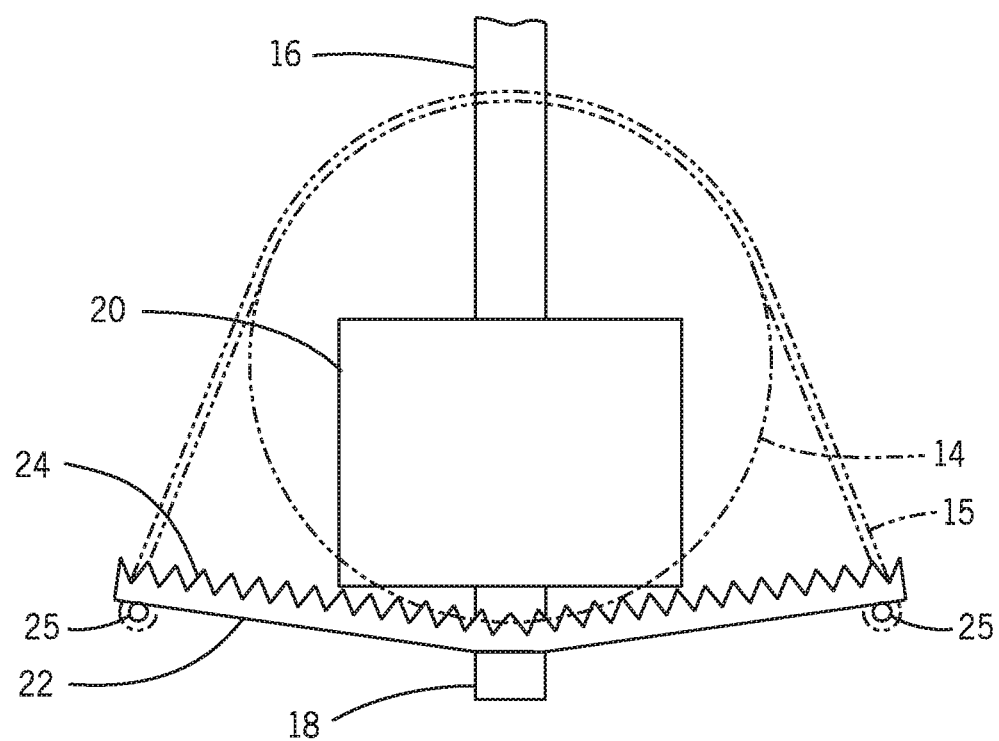
FIG. 3 is a detail rear view of an embodiment of the present invention in use.

Referring to FIGS. 1 through 3, the present invention includes a hitch attachment 10. The hitch attachment 10 secures to all-terrain vehicles 11 (ATV) or other types of vehicles and is used for dragging logs 14. The hitch attachment 10 includes a base 18 having a distal end and a proximal end. The proximal end of the base 18 is configured to fit within a tow receiver 12 of the vehicle. A vertical frame 16 extends from the base 18 in between the proximal end and the distal end. A log cradle 22 is coupled to the distal end of the base 18. The log cradle 22 includes a plurality of vertically extending teeth 24.

The log cradle 22 may include a pair of arms extending away from one another at an incline plane from a central portion forming a V-shape. The vertically extending teeth 24 may be triangular shaped and may be arranged adjacent to one another. In certain embodiments, a pair of pins 25 may be coupled to the log cradle 18. The pair of pins 25 may be horizontally disposed and may be coupled to opposing sides of the log cradle 18. In certain embodiments, a kick plate 20 may be coupled to a front surface of the vertical frame member 16 facing towards the log cradle 18. In such embodiments, an end of a log 14 may be placed on top of the vertically extending teeth 24 and may abut against the kick plate 20. A strap 15 may wrap around the top of the log 14. Ends of the strap 15 releasably secure to the pair of pins 25 via hooks, thereby securing the log 14 to the hitch attachment 10.

The present invention may further include a winch 30 for raising the end of the log 14 up and onto the log cradle 22. In such embodiments, the winch 14 is coupled to the vertical frame member 16. The winch 30 may be a manual winch 14 with a crank lever 17 or alternately, the winch 30 may be powered by a motor. A horizontal frame member 19 extends from a top end of the vertical frame member 16. A pulley 28 is coupled to the horizontal frame member 19 by a swivel clevis 26. The swivel clevis 26 may rotate 360 degrees about a vertical axis. A cable 32 includes a first end and a second end. The first end is secured to a rotor of the winch 30. The cable 32 runs from the winch 30 and through the pulley 28. An end of the cable 32 includes a hook 34.

To use the present invention, the manual crank lever 17 is rotated in a first direction to allow the cable 32 to have some slack. The cable 32 is wrapped around an end of the log 14 and hooked to itself to secure the log 14 to the cable 32. The manual crank lever is then rotated in a second direction opposite the first direction to lift the end of the log 14. The end of the log 14 is then placed on the log cradle 22 and the teeth 24 embed into the log 14. The hook 34 is then released and the cable 32 is removed. A strap 15 is then wrapped around the log 14 and secured to the pins 25, thereby securing the log 14 to the hitch attachment 10. The user may then drive the ATV 11 and transport the log 14 to a desired location.

It should be understood, of course, that the foregoing relates to exemplary embodiments of the invention and that modifications may be made without departing from the spirit and scope of the invention as set forth in the following claims.

What is claimed is:

1. A hitch attachment comprising:
   a base comprising a distal end and a proximal end, wherein the proximal end is configured to couple the hitch attachment with a tow receiver;
   a vertical frame member extending from the base in between the proximal end and the distal end;
   a log cradle coupled to the distal end of the base, the log cradle comprising a pair of freestanding arms extending away from one another at an incline plane from a central portion forming a V-shape, a plurality of vertically extending teeth disposed along the pair of freestanding arms, the plurality of vertically extending teeth oriented to impinge a forward end of a log to couple the log to the hitch attachment while dragging an aft end of the log;

a winch coupled to the vertical frame member;

a horizontal frame member extending from a top end of the vertical frame member; and a pulley coupled to the horizontal frame member and suspended distal to the coupling of the log cradle with the base, and a cable from the winch which runs through the pulley, such that the forward end of the log may be lifted by the cable and lowered onto the log cradle to be impinged by the plurality of teeth.

2. The hitch attachment of claim 1, further comprising a pair of pins horizontally disposed and coupled to opposing ends of the log cradle.

3. The hitch attachment of claim 1, wherein a hook is secured to the end of the cable.

4. The hitch attachment of claim 1, further comprising a manual crank lever operably connected to the winch.

5. The hitch attachment of claim 1, further comprising a kick plate coupled to a surface of the vertical frame member facing towards the log cradle.

6. The hitch attachment of claim 1, wherein the the pair of freestanding arms are disposed beyond the distal end of the base.

7. The hitch attachment of claim 6, wherein the pulley is positioned so that an end of the cable is vertically suspended beyond the distal end of the base.

8. A hitch attachment, comprising:

a base comprising a distal end and a proximal end, wherein the proximal end is configured to fit within a tow receiver;

a log cradle coupled to the distal end of the base, the log cradle comprising a pair of freestanding arms extending away from one another at an incline plane from a central portion attached to the distal end of the base, the pair of freestanding arms forming a V-shape; and a plurality of vertically extending teeth disposed along the pair of freestanding arms, the plurality of vertically extending teeth oriented to impinge a forward end of a log, with an aft end of the log contacting a ground surface when the log is transported by the hitch attachment; and a pair of pins horizontally disposed and coupled to opposing ends of the pair of freestanding arms, the pair of pins configured to receive a strap to secure the forward end of the log against the plurality of vertically extending teeth;

a vertical frame member extending from the base intermediate the proximal end and the distal end;

a winch coupled to the vertical frame member;

a horizontal frame member extending from a top end of the vertical frame member; and a pulley coupled to the horizontal frame member, and a cable extending from the winch which runs through the pulley, wherein the cable is configured to extend from the pulley distal to the position of the pair of freestanding arms to lift the forward end of the log onto the pair of freestanding arms of the log cradle.

* * * * *